(12) United States Patent
Hioki et al.

(10) Patent No.: US 8,317,407 B2
(45) Date of Patent: Nov. 27, 2012

(54) OPTICAL CONNECTOR PLUG WITH SHUTTER

(75) Inventors: Yasusuke Hioki, Tokyo (JP); Norio Iguchi, Tokyo (JP)

(73) Assignee: Sanwa Denki Kogyo Co., Ltd., Tokyo (JP)

( * ) Notice: Subject to any disclaimer, the term of this patent is extended or adjusted under 35 U.S.C. 154(b) by 160 days.

(21) Appl. No.: 12/926,942

(22) Filed: Dec. 20, 2010

(65) Prior Publication Data

US 2011/0206325 A1 Aug. 25, 2011

(30) Foreign Application Priority Data

Feb. 22, 2010 (JP) ................................. 2010-036285

(51) Int. Cl.
*G02B 6/38* (2006.01)
*G02B 6/36* (2006.01)

(52) U.S. Cl. ............... 385/73; 385/53; 385/55; 385/58; 385/70; 385/75; 385/76; 385/88; 385/92

(58) Field of Classification Search .................. 385/70, 385/72, 73, 75, 77, 78, 90
See application file for complete search history.

(56) References Cited

U.S. PATENT DOCUMENTS

| | | | |
|---|---|---|---|
| 2004/0052473 A1* | 3/2004 | Seo et al. ..................... | 385/73 |
| 2004/0081406 A1* | 4/2004 | Grob et al. .................... | 385/76 |
| 2004/0161204 A1* | 8/2004 | Zimmel et al. ................ | 385/73 |
| 2008/0247709 A1* | 10/2008 | Eguchi et al. ................ | 385/60 |
| 2011/0206325 A1* | 8/2011 | Hioki et al. ................... | 385/76 |

* cited by examiner

*Primary Examiner* — Rhonda Peace
(74) *Attorney, Agent, or Firm* — Bacon & Thomas, PLLC

(57) ABSTRACT

For a less load to a shutter and secure motions of the shutter without damaging a ferrule, a rear stopper guide (22) and an intermediate spring guide (23) covering an upper side of a hold of an optical plug, and an outer cover (24) covering a front outer periphery of the hold are provided; the outer cover (24) is pushed by an optical connector adapter (Q) to move from a front end position of the hold to a rear end position, an inner side of the outer cover (24) is provided with a shutter (21) which can be swung from a lid close position to a lid open position, and the shutter (21) is automatically opened and closed by a shutter automatic opening and closing mechanism (S) in accordance with a rack and pinion system, working with rearward and forward movements of the outer cover (24).

2 Claims, 8 Drawing Sheets

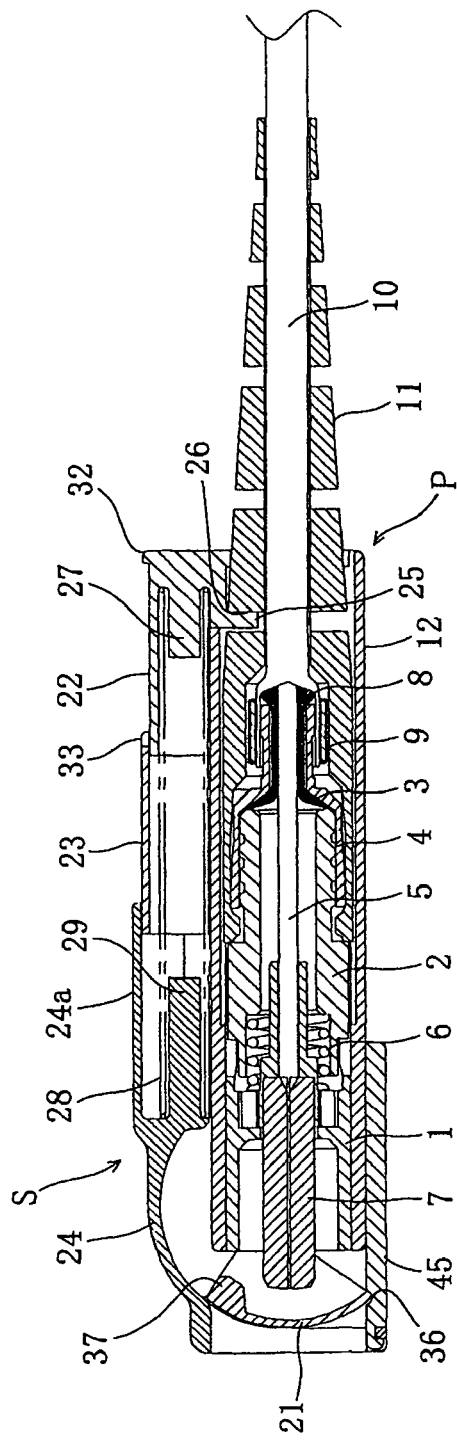
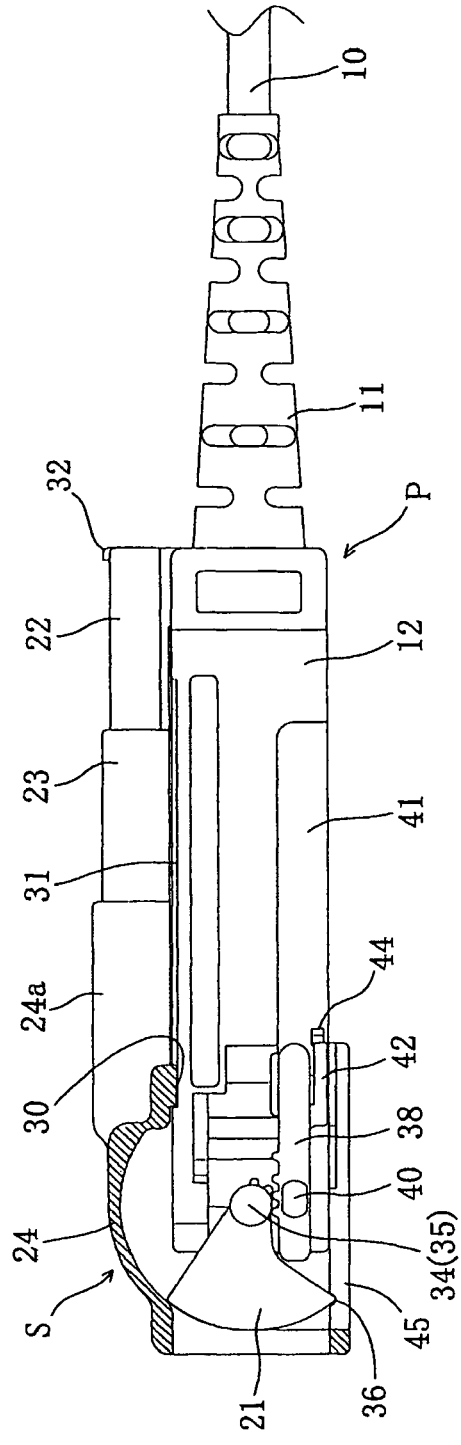
FIG. 1(A)
FIG. 1(B)

OPTICAL CONNECTOR PLUG WITH SHUTTER

BACKGROUND OF THE INVENTION

1. Field of the Invention

The present invention relates to an optical connector plug with a shutter structured such as to be shut off by the shutter at a time when it is not fitted to an optical connector adapter, and to automatically open the shutter at a time when it is fitted.

2. Description of the Conventional Art

Conventionally, as this kind of optical connector plug provided with the automatically opened and closed shutter, there exists an optical connector plug provided with a shield plate, and a drive mechanism automatically opening and closing the shield plate, for example, as disclosed in Japanese Unexamined Patent Publication No. 2006-276782. In particular, the structure is made such that a movable element is pressed relatively rearward with respect to a sliding sleeve against spring force of a push spring on the basis of a contact or an interference of the movable element of the drive mechanism with an adapter opening portion in accordance with insertion of the plug to the adapter, a shielding piece provided integrally with the movable element is elastically deformed in accordance with the rearward movement of the movable element so as to become in a flat shape, and a shielding portion of the shielding piece swivels so as to be completely detached from a front side of a front end surface of a ferrule in a process of the elastic deformation, thereby being transferred from a close state to an open state.

Further, as disclosed in Japanese Unexamined Patent Publication No. 2009-139804, there exists an optical connector plug with a shutter which is provided with a pair of shutters arranged so as to be vertically opposed, and a switch mechanism automatically opening and closing the shutter. In particular, when the optical connector plug with the shutter is fitted to a receptacle connector, a switch of the switch mechanism is moved toward a canceling position in a lateral direction against energizing force of a torsion spring, and the rearward movement of the switch is cancelled, and when the optical connector plug with the shutter is inserted toward the receptacle connector so as to be further fitted, the switch moves rearward along a backward moving groove portion and a front housing simultaneously moves rearward, whereby each of a pair of upper and lower shutters is pulled rearward and an inner surface thereof collides with an end portion of a plug frame so as to be expanded, so that a light shielding action of the shutter is cancelled, and the ferrule is connected at a ferrule in the receptacle connector side.

SUMMARY OF THE INVENTION

Problem to be Solved by the Invention However, in the case of the conventional structure disclosed in the Japanese Unexamined Patent Publication No. 2006-276782, since the shielding portion directly contacts with the ferrule in accordance with insertion of the plug to the adapter, there is a risk that the front end portion of the ferrule is damaged on the basis of the movement of the shielding portion.

Further, in the case of the structure disclosed in the Japanese Unexamined Patent Publication No. 2009-139804, since the shutters are a pair arranged so as to be vertically opposed, it is necessary to provide the torsion springs in correspondence to the respective shutters, and a whole structure becomes very complicated.

Accordingly, the present invention is worked out in consideration of the conventionally existing various circumstances mentioned above, and an object of the present invention is to provide an optical connector plug with a shutter which is shielded by a shutter at a time when it is not fitted to an optical connector adapter, and automatically opens the shutter at a time when it is fitted, in which a load applied to the opening and closing shutter can be lightened as well as automatic opening and closing motions of the shutter can be securely carried out without damaging a front end of a ferrule, and a structure is made simple.

Means for Solving the Problem

In order to solve the problem mentioned above, in accordance with the present invention, there is provided an optical connector plug with a shutter structured such as to be normally shut by an approximately sealing type shutter at a time when it is not fitted to an optical connector adapter, and to automatically open the shutter at a time when it is fitted to the optical connector adapter, the optical connector plug comprising:

a rear stopper guide and an intermediate spring guide covering an upper side of a hold of the optical plug; and an outer cover covering a front outer periphery of the hold, wherein the outer cover can be pushed by the optical connector adapter so as to move rearward from a front end position of the hold of the optical plug to a rear end position, an inner side of the outer cover is provided with the shutter which can be swung from a lid close position to a lid open position, and the shutter can be automatically opened and closed by a shutter automatic opening and closing mechanism in accordance with a rack and pinion system, working with rearward and forward movements of the outer cover.

The shutter automatic opening and closing mechanism is provided with rack arms which are arranged so as to be slidable with respect to the outer cover in an inner side of the outer cover and is movable synchronously with the outer cover at slide ends, and pinions which are provided co axially and integrally with an opening and closing shaft portion of the shutter, and the pinions are engaged with tooth portions of the rack arms.

Effect of the Invention

In accordance with the present invention, an optical plug, which is shielded by an approximately sealing type shutter at a time when it is not fitted to an optical connector adapter and automatically opens the shutter at a time when it is fitted, can be structured such that a load applied to the opening and closing shutter is lightened as well as automatic opening and closing motions of the shutter are securely carried out without damaging a front end of a ferrule, and the whole structure can be made simple.

In particular, since the optical plug is provided with the rear stopper guide and the intermediate spring guide covering the upper side of the hold of the optical plug, and the outer cover covering the front outer periphery of the hold, the outer cover can be pushed by the optical connector adapter so as to move rearward from the front end position of the hold of the optical plug to the rear end position, the inner side of the outer cover is provided with the shutter which can be swung from the lid close position to the lid open position, and the shutter can be automatically opened and closed by the shutter automatic opening and closing mechanism in accordance with the rack and pinion system, working with the rearward and forward movements of the outer cover, it becomes possible to easily and securely carry out the automatic opening and closing motions of the shutter without damaging the front end of the ferrule.

Further, since the shutter automatic opening and closing mechanism is provided with the rack arms which are arranged so as to be slidable with respect to the outer cover in the inner side of the outer cover and is movable synchronously with the outer cover at the slide ends, and the pinions which are provided coaxially and integrally with the opening and closing shaft portion of the shutter, and the pinions are engaged with the tooth portions of the rack arms, it becomes possible to lighten the load applied to the opening and closing shutter by the use of the shutter automatic opening and closing mechanism in accordance with the rack and pinion system.

BRIEF EXPLANATION OF DRAWINGS

FIGS. 1A and 1B show an example of a structure of an optical connector plug with a shutter in accordance with an embodiment for carrying out the present invention, in which FIG. 1A is a sectional view and FIG. 1B is a partly cut side view;

FIGS. 3A to 3F show an example of an outer appearance shape of the optical connector plug with the shutter, in which FIG. 3A is a plan view, FIG. 3B is a plan view of a state in which an outer cover is moved rearward, FIG. 3C is a side view, FIG. 3D is a side view of a state in which the outer cover is moved rearward, FIG. 3E is a front view of a state in which the shutter is closed, and FIG. 3F is a front view of a state in which the shutter is opened;

FIGS. 4A to 4C show a case that the optical connector plug with the shutter is connected to an optical connector adapter, in which FIG. 4A is a plan view of a state before the connection, FIG. 4B is a side view of a state after the connection, and FIG. 4C is a partly cut plan view of a state after the connection;

DESCRIPTION OF REFERENCE NUMERALS

Figure 2:
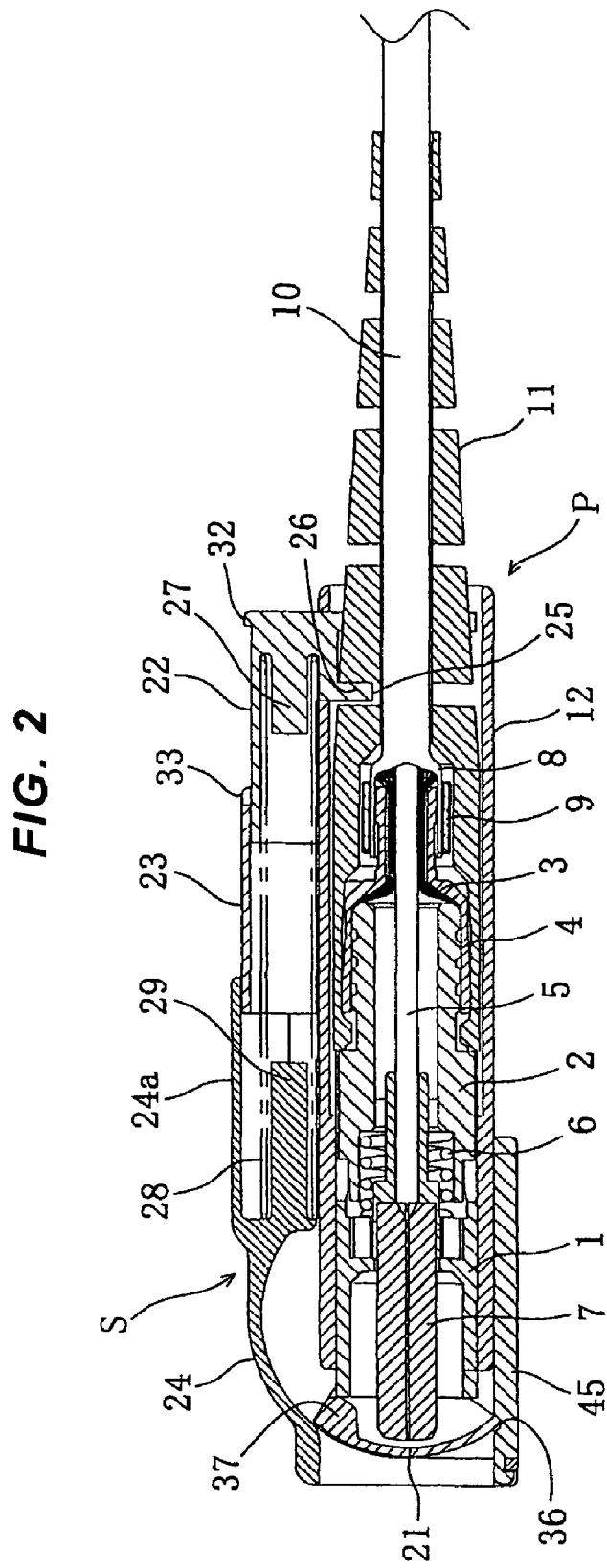
FIG. 2 is a sectional view of the same in a state in which a plug frame strikes against the shutter at a lid close position.
Figure 3A:
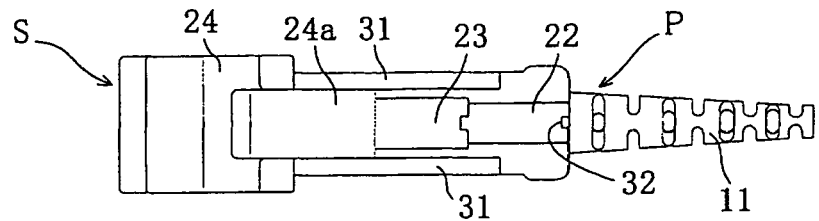
Figure 3B:
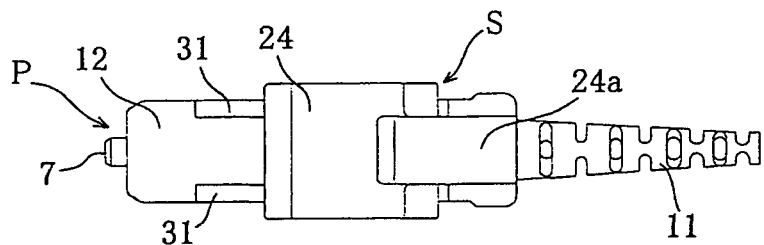
Figure 3B:
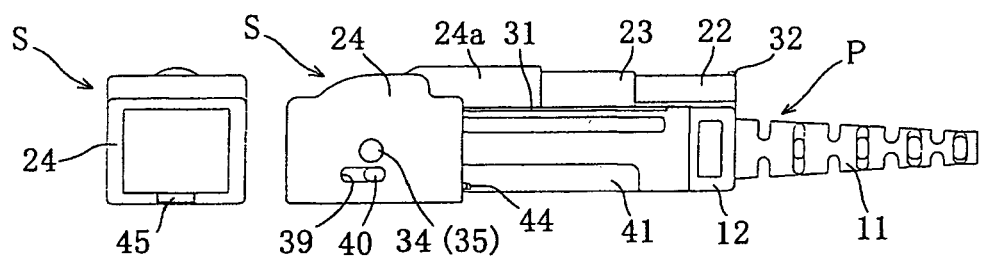
Figure 3B:
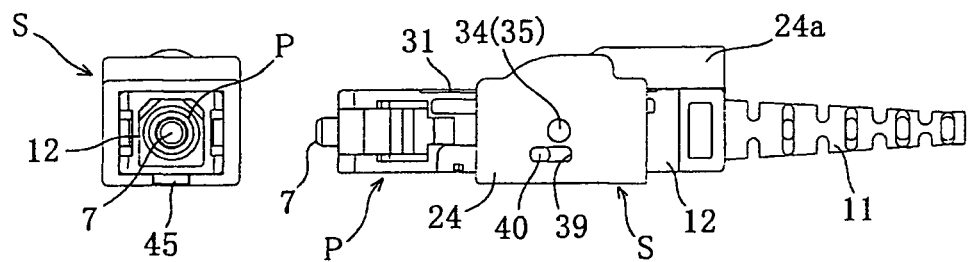

P optical plug
Q optical connector adapter
S shutter automatic opening and closing mechanism
1 plug frame
2 stop ring
3 Kevlar
4 caulking ring
5 optical fiber
6 compression spring
7 ferrule
8 cord exterior covering
9 ring
10 optical fiber cord
11 boot
12 hold
21 shutter
22 stopper guide
23 spring guide
24 outer cover
24a extension portion
25 engagement projection
26 gap
27 projection
28 spring
29 projection
30 guide projection
31 guide long groove
32 locking portion
33 concave portion
34 pinion
35 opening and closing shaft portion
36 concave portion
37 convex portion
38 rack arm
39 guide hole
40 guide projection
41 guide portion
42 hook arm
43 locking portion
44 stopper portion
45 bottom cover

DETAILED DESCRIPTION OF PREFERRED EMBODIMENT

A description will be in detail given below of an embodiment in accordance with the present invention with reference to the accompanying drawings.

In the present invention, reference symbol P shown in the drawings denotes an optical plug. The optical plug P is constructed by a tubular plug frame 1, cylindrical stop ring 2 which is fitted and fixed with its front portion in a rear portion of the plug frame 1 by an engaging means constituted by an engagement projection and an engagement hole, a caulking ring 4 which fixes by caulking a Kevlar 3 to a rear outer peripheral surface of the stop ring 2, an optical fiber 5 which is inserted to the stop ring 2 and the caulking ring 4, a ferrule 7 which fixes the optical fiber 5 by penetration in its core and is arranged in a core of the plug frame 1 via a compression spring 6 with respect to the stop ring 2, a ring 9 which fixes a cord exterior covering 8 with respect to an outer peripheral surface of a rear portion of the caulking ring 4, a boot 11 which covers the caulking ring 4, the ring 9 and an optical fiber cord 10, and a hold 12 which covers each of the plug frame 1 and the stop ring 2, as shown in FIGS. 1A and 2.

As shown in FIGS. 1B, 5A to 5E, and 7A to 7F; a shutter automatic opening and closing mechanism S in accordance with a rack and pinion system, which is structured such as to be normally shielded by an approximately sealing type shutter 21 at a time when it is not fitted to an optical connector adapter Q, and automatically opens the shutter 21 at a time when it is fitted to the optical connector adapter Q, is attached to an outer periphery of the hold 12 of the optical plug P.

In particular, the shutter automatic opening and closing mechanism S is installed to the optical plug P by being attached, as shown in FIGS. 1A and 2, in such a manner that a stopper guide 22 in a rear position and an intermediate spring guide 23 covering an upper side of the hold 12 and an outer cover 24 covering a front portion of the hold 12 in an angular shape can be extended and contracted telescopically.

First of all, as shown in FIG. 1B, the stopper guide 22 fixes by an engagement projection 25 hanging down to a lower side close to a rear portion and engaging with a gap 26 between the hold 12 and the boot 11. Further, a projection 27 is formed toward a front side in an inner side of the stopper guide 22, and one end of a spring 28 is locked to the projection 27. The spring guide 23 can slidably move on an upper surface of the stopper guide 22, and an approximately intermediate portion of the spring 28 can pass through an inner side thereof.

The outer cover 24 is formed in an approximately rectangular tubular shape which is approximately the same shape as that of an outer periphery of a housing H of the optical connector adapter Q, as shown in FIGS. 1A, 2, 3A to 3F, 4A, 4B and 4C, and is structured such that an extension portion 24a protruding from an upper side thereof toward a rear portion side can slidably move on an upper surface of the spring guide 23.

Further, a projection 29 is formed toward a rear side in an inner side of the extension portion 24a, and the other end of the spring 28 is locked to the projection 29. The hold 12 of the optical plug P is inserted into a tube inner portion of the outer cover 24, and a guide projection 30 provided to protrude approximately on the center of an upper inner surface of the outer cover 24 is engaged with a guide long groove 31 formed along a longitudinal direction of the upper surface of the hold (refer to FIG. 1B).

Accordingly, when the plug P (the hold 12) moves forward with respect to the outer cover 24, the outer cover 24 is relatively slid toward the stopper guide 22 side (the rear portion side of the hold 12) along the guide long groove 31 while the spring 28 is compressed.

Further, as shown in FIGS. 1A, 2, 5E and 7.1A, a locking portion 32 is provided to protrude toward an upper side, on a rear end portion of the upper surface of the stopper guide 22, and a concave portion 33 is formed in the center of a rear end of the spring guide 23 so as to oppose thereto. Accordingly, a sliding breakaway of the outer cover 24 and the spring guide 23 to a rear side of the stopper guide 22 can be stopped on the basis of fitting between the locking portion 32 and the concave portion 33.

As shown in FIGS. 1A, 1B, 2, 5A, 5C, 5D, 5E, 7A, 7C and 7E, a shutter 21 in a mask shape having an approximately circular arc sectional shape (approximately one quarter spherical shell) is provided in an inner side of a front opening portion of the outer cover 24 in such a manner as to be opened and closed by an opening and closing shaft portion (in such a manner that the shutter 21 surface can be swung between a forward position and an upward position).

In other words, as shown in FIGS. 1B, 5A, 5C, 5D, 5E, 7A, 7C, and 7E, an opening and closing shaft portion 35 which is coaxial and integral with pinions (or which is formed to have a pinion shape at both ends) is provided between both right and left ends of the shutter 21, and the opening and closing shaft portion 35 is rotatably pivoted to bearings (not shown) provided in inner surfaces of right and left side walls of the outer cover 24.

Further, an upper surface of the opening portion of the outer cover 24 is formed in a hood shape having a circular arc shape toward an upper side in order to secure an evacuation space at a time when the shutter 21 is swung to the upward position.

Further, a bottom cover 45 is provided at a bottom position of the outer cover 24, and a concave portion 36 for supporting a lower end portion of the closed shutter 21 is formed in a front face opening side of the bottom cover 45. Further, the shutter automatic opening and closing mechanism S can be easily installed to the existing optical plug P, by the bottom cover 45, and the engagement projection 25 of the stopper guide 22 which engages with the gap 26 between the hold 12 and the boot 11.

As shown in FIGS. 1A and 2, a convex portion 37 having an approximately trapezoidal sectional shape is provided on an inner side of an upper edge portion of the shutter 21, and even if the boot 11 is intentionally held and pushed forward before the insertion of the plug P to the optical connector adapter Q, the plug frame 1 comes into contact with the convex portion 37 provided on the shutter 21 so as to be locked, whereby the shutter 21 itself is prevented from coming into contact with a front end of the ferrule 7.

Opening and closing elements of the shutter automatic opening and closing mechanism S are provided with rack arms 38 which are arranged so as to be slidable rearward and forward with respect to the outer cover 24 in both right and left inner sides of the outer cover 24 and are movable rearward synchronously with the outer cover 24 at slide ends, and the above mentioned pinions 34 which are coaxial and integral with the opening and closing shaft portion 35 of the shutter 21, where the pinions 34 are engaged with tooth portions of the rack arms 38, as shown in FIGS. 1B, 5A, 5C, 5D, 5E, 7A, 7C and 7E.

Figure 4A:
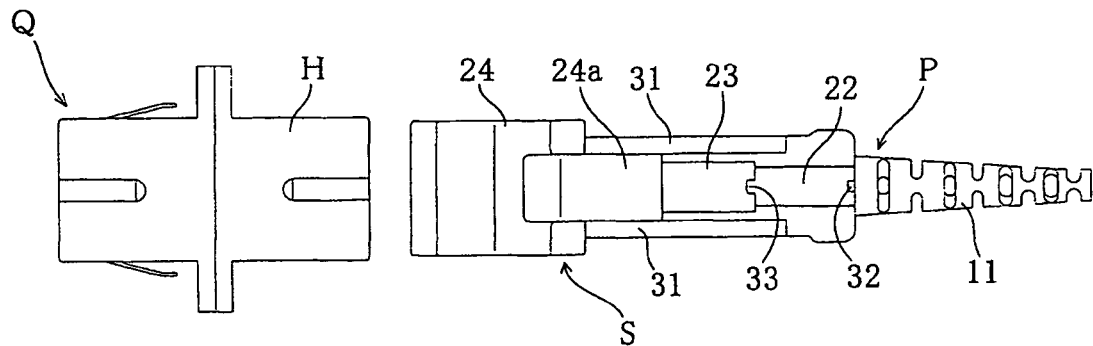
Figure 4B:
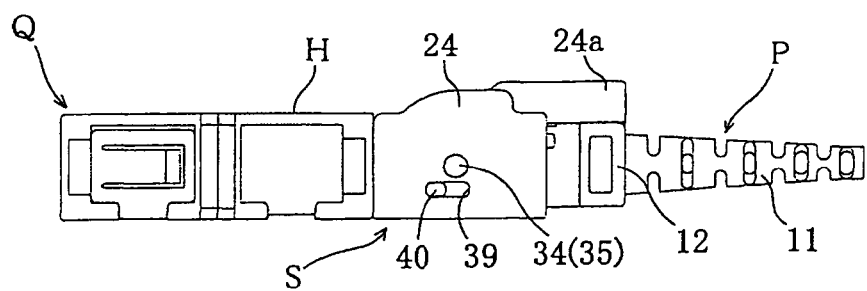
Figure 4C:
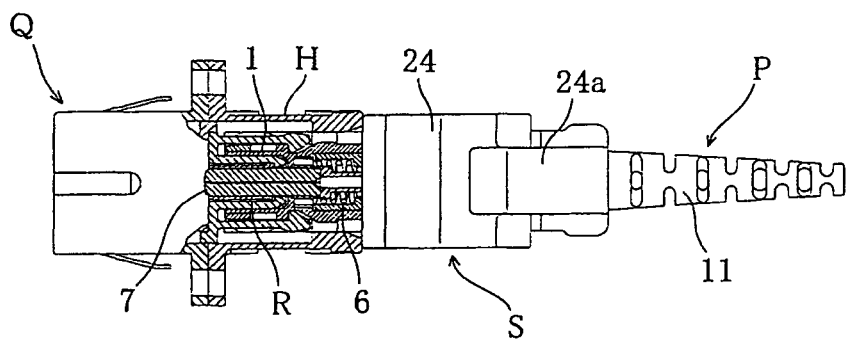

Specifically, the wide rack arm 38 having the tooth portion formed at an upper side in a longitudinal direction is arranged on each of the inner surfaces at a lower sides of the right and left side walls of the outer cover 24. In this structure, as shown in FIGS. 3C, 3D and 4B, guide holes 39 having a transverse oval opening shape are formed in the lower sides of the right and left side walls of the outer cover 24, and guide projections 40 provided to protrude on one surface of the rack arms 38 are engaged with the guide holes 39.

Further, as shown in FIGS. 1B, 3C, 5A, 5B, 5C, 5D, 5E, 6A, 6B, 6C, 7A, 7B, 7C and 7E, the rack arms 38 are fitted to guide portions 41 which are provided in a concave shape along a longitudinal direction at the lower ends of both the right and left sides of the hold 12, thereby being movable rearward and forward with respect to the hold 12. Further, the tooth portions of the rack arms 38 are engaged with the pinions 34 which are coaxial and integral with the opening and closing shaft portion 35 of the shutter 21, and the shutter 21 is automatically opened and closed via the pinion 34 and the rack arms 38 in accordance with the rearward and forward movements along the guide holes 39 of the rack arms 38.

Further, hook arms 42 formed in an approximately transverse L-shape are provided at approximately the center of lower ends of the rack arms 38 so as to protrude toward a rear side, and projection shaped locking portions 43 are provided on inner sides of protruding end portions of the hook arms 42. In correspondence to those, stoppers 44 are provided on front lower sides of the guide portions 41 of the hold 12 to which the rack arms 38 are fitted.

Accordingly, the guide projections 40 of the rack arms 38 move along the guide holes 39 of the outer cover 24 and the shutter 21 starts opening, at a time when the outer cover 24 moves rearward with respect to the plug P (the hold 12), however, the locking portions 43 (the rack arms 38) of the hook arms 42 are at this time, come into contact with the stopper portions 44 of the guide portions 41 (the hold 12) so as to be prevented from moving rearward (refer to FIGS. 5A, 5B, 5C and 5D).

Further, when the guide projections 40 come into contact with the front edge portions of the guide holes 39, the locking portions 43 of the hook arms 42 run on the stopper portions 44 of the guide portions 41 and the rack arms 38 move rearward along the guide portions 41. In other words, the rack arms 38 move synchronously with the outer cover 24 (refer to FIGS.

6A, 6B and 6C). Accordingly, the outer cover 24 moves rearward to the position of the stopper guide 22 at the rear position, while compressing the spring 28. At this time, the sliding breakaway of the outer cover 24 and the spring guide 23 to the rear side of the stopper guide 22 is stopped by the locking portion 32 of the stopper guide (refer to FIGS. 3D, 4B, 5E and 7A).

Next, a description will be given of an example of a use and a motion of the embodiment structured as mentioned above.

As shown in FIG. 4, when the optical plug P is inserted to the optical connector adapter Q, the outer cover 24 comes into contact with an inlet or the like of the insertion opening portion of the optical connector adapter Q, and the outer cover 24 starts moving rearward.

At this time, as shown in FIGS. 5A, 5B, 5C and 5D, the guide projections 40 of the rack arms 38 move forward along the guide holes 39 of the outer cover 24, and the shutter 21 starts opening via the pinions 34 and the rack arms 38, however, since the locking portions 43 (the rack arms 38) of the hook arms 42 at this time come into contact with the stopper portions 44 of the guide portions 41 (the hold 12) and can not move rearward, the rearward movement of the rack arms 38 is blocked, whereby the shutter 21 starts opening.

Figure 5A:
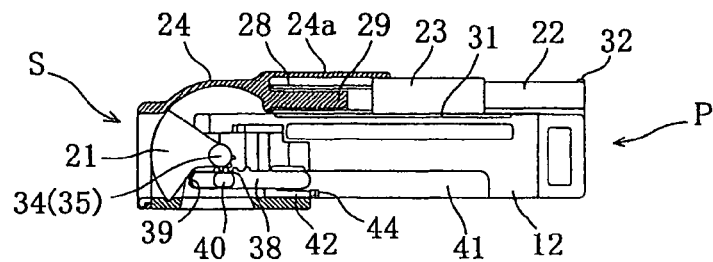
FIGS. 5A to 5E are explanatory views showing a shutter motion of the optical connector plug with the shutter at a time when it is inserted to the optical connector adapter.
Figure 5B:
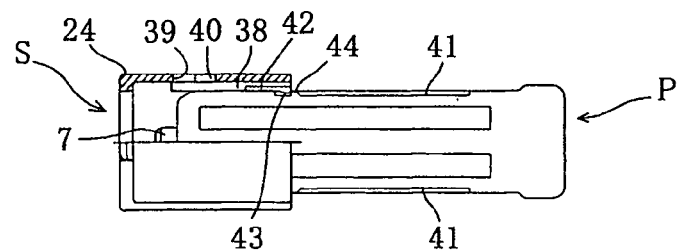
Figure 5C:
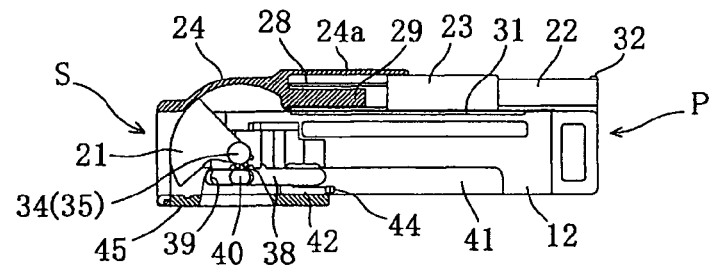
Figure 5D:
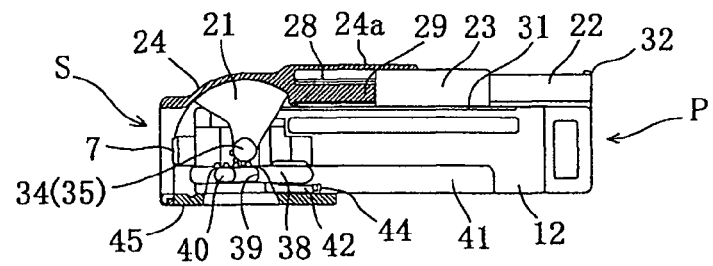
Figure 5E:
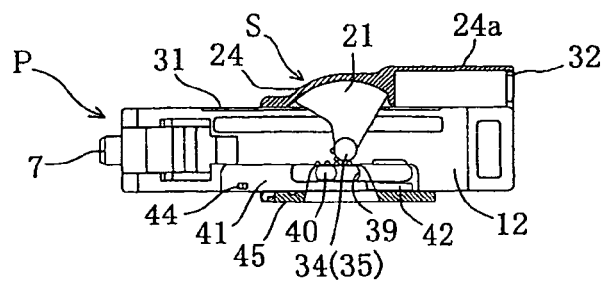
Figure 6A:
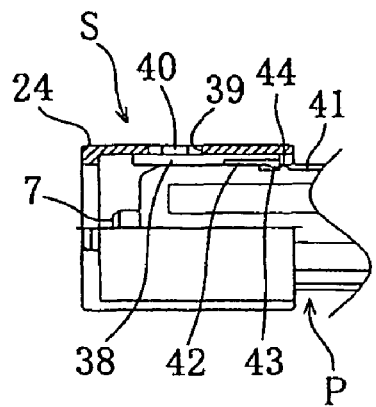
FIGS. 6A to 6C are explanatory views showing a motion of an outer cover and a rack arm.
Figure 6B:
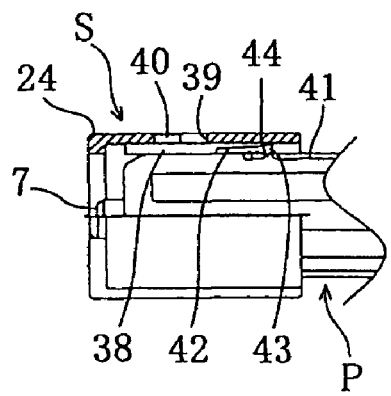
Figure 6C:
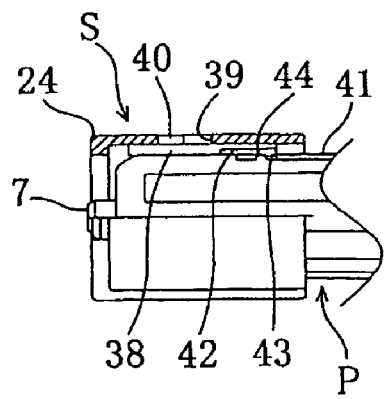

Further, as shown in FIG. 5D, the shutter 21 is fully opened at a time when the guide projections 40 come into contact with the front edge portions of the guide holes 39, and the locking portions 43 of the hook arms 42 run on the stopper portions 44 of the guide portions 41 and the rack arms 38 move along the guide portions 41, as shown in FIG. 5E. In other words, the rack arms 38 move synchronously with the outer cover 24.

Accordingly, the outer cover 24 moves rearward to the position of the stopper guide 22 at the rear position while compressing the spring 28, together with the spring guide 23. In other words, the optical plug P moves so as to protrude forward from the outer cover 24. At the end of this movement, the ferrule 7 of the optical plug P is inserted to the sleeve holder R of the optical connector adapter Q (refer to FIG. 4C).

Figure 7A:
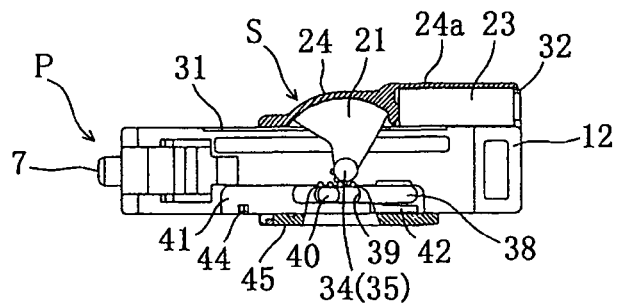
FIG. 7A to 7D are explanatory views showing a shutter motion of the optical connector plug with the shutter at a time when it is taken out of the optical connector adapter.
Figure 7B:
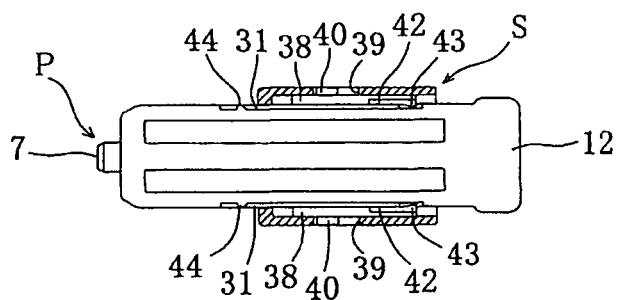
Figure 7C:
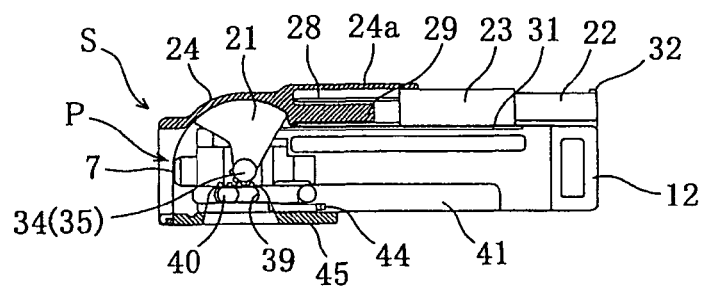
Figure 7D:
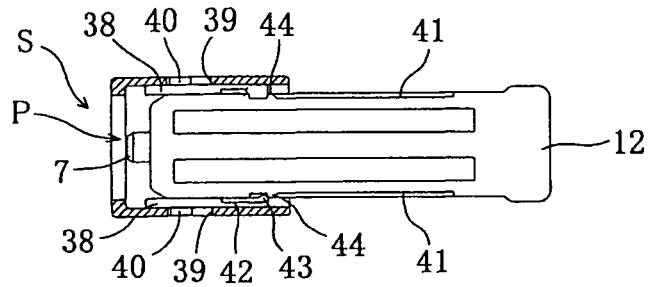

When the optical plug P is taken out of the optical connector adapter Q, the outer cover 24 returns to the front position of the hold 12 along the guide portions 41 at the lower side of the hold 12 and the guide long groove 31 at the upper surface side of the hold 12 on the basis of elastic restoring force of the spring 28, and the locking portions 43 of the hook arms 42 run on the stopper portions 44 of the guide portions 41 so as to be locked, as shown in FIGS. 7A, 7B and 7C.

In other words, the locking portions 43 of the hook arms 42 are caught in the concave portions between the front end side of the hold 12 and the stopper portions 44 of the guide portions 41, the outer cover 24 moves further forward on the basis of the elastic restoring force of the spring 28 at this time, and the guide projections 40 of the rack arms 38 move rearward along the guide holes 39 of the outer cover 24.

Figure 7E:
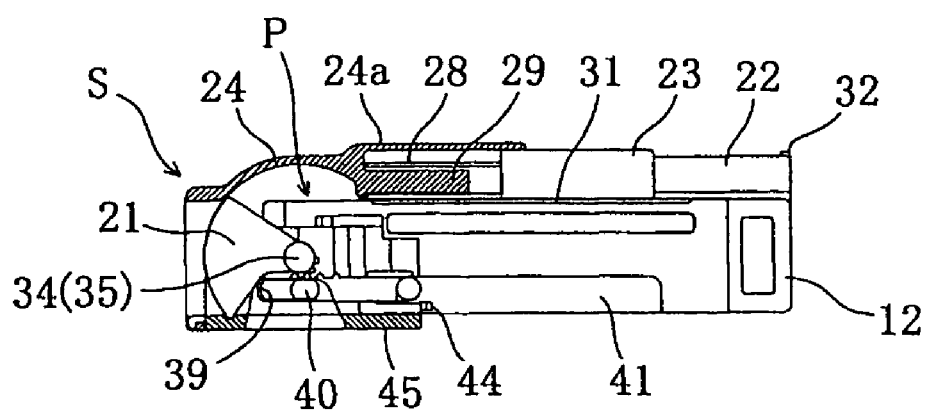
FIGS. 7E to 7F are explanatory views showing a shutter motion of the optical connector plug with the shutter at a time when it is taken out of the optical connector adapter.
Figure 7F:
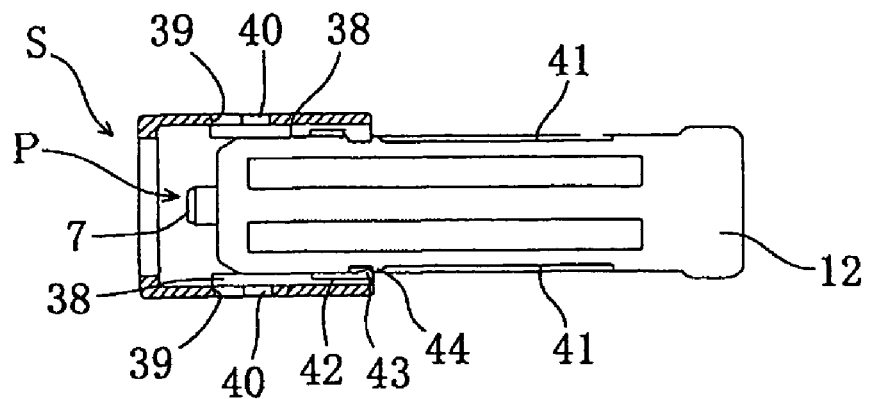

The shutter 21 is swung in the lid closing direction with interlocking of the rack arms 38 and the pinions 34 during the movement at the length of the guide holes 39 of the hold 12, and the shutter 21 comes to a state of complete closure, at a time when the guide projections 40 come into contact with the rear edge portions of the guide holes 39 (refer to FIGS. 7E and 7F).

Accordingly, it is possible to lighten the load applied to the opening and closing shutter 21 as well as it is possible to securely carry out the automatic opening and closing motion of the shutter 21 without damaging the front end of the ferrule 7.

What is claimed is:

1. An optical connector plug with a shutter structured such as to be normally shut by an approximately sealing type shutter at a time when it is not fitted to an optical connector adapter, and to automatically open the shutter at a time when it is fitted to the optical connector adapter, the optical connector plug comprising:

a rear stopper guide and an intermediate spring guide covering an upper side of a hold of the optical plug; and an outer cover covering a front outer periphery of the hold, wherein said outer cover can be pushed by the optical connector adapter so as to move rearward from a front end position of the hold of the optical plug to a rear end position, an inner side of the outer cover is provided with the shutter which can be swung from a lid close position to a lid open position, and the shutter can be automatically opened and closed by a shutter automatic opening and closing mechanism in accordance with a rack and pinion system, working with a rearward and forward movements of the outer cover.

2. An optical connector plug with a shutter as claimed in claim 1, wherein the shutter automatic opening and closing mechanism is provided with rack arms which are arranged so as to be slidable with respect to said outer cover in an inner side of the outer cover and is movable synchronously with the outer cover at slide ends, and pinions which are provided coaxially and integrally with an opening and closing shaft portion of the shutter, and the pinions are engaged with tooth portions of said rack arms.

\* \* \* \* \*